US012510655B1

(12) United States Patent
Zhu et al.

(10) Patent No.: US 12,510,655 B1
(45) Date of Patent: Dec. 30, 2025

(54) INTELLIGENT IDENTIFICATION METHOD AND SYSTEM FOR CREEPING LANDSLIDE HAZARDS BASED ON WRAPPED INTERFEROGRAMS

(71) Applicant: Chang'an University, Xi'an (CN)

(72) Inventors: Wu Zhu, Xi'an (CN); Ruixuan Zhang, Xi'an (CN); Qin Zhang, Xi'an (CN); Yue Wang, Xi'an (CN); Zhenhong Li, Xi'an (CN); Jiewei Zhan, Xi'an (CN); Qiangbing Huang, Xi'an (CN); Zufeng Li, Xi'an (CN)

(73) Assignee: Chang'an University, Xi'an (CN)

( * ) Notice: Subject to any disclaimer, the term of this patent is extended or adjusted under 35 U.S.C. 154(b) by 0 days.

(21) Appl. No.: 19/206,128

(22) Filed: May 13, 2025

(30) Foreign Application Priority Data

Aug. 16, 2024 (CN) .......................... 202411129593.1

(51) Int. Cl.
*G01S 13/90* (2006.01)
*G06T 3/4046* (2024.01)
(Continued)

(52) U.S. Cl.
CPC ........ *G01S 13/9023* (2013.01); *G06T 3/4046* (2013.01); *G06T 11/001* (2013.01);
(Continued)

(58) Field of Classification Search
CPC .......... G06T 7/60; G06T 7/194; G06T 17/00; G06T 2207/10024; G06T 2207/10028;
(Continued)

(56) References Cited

U.S. PATENT DOCUMENTS

2020/0404272 A1   12/2020   Abe et al.

FOREIGN PATENT DOCUMENTS

| CN | 114511790 A | 5/2022 |
| CN | 116973917 A | 10/2023 |

OTHER PUBLICATIONS

Moualla, Lama, et al. "Learning Ground Displacement Signals Directly from InSAR-Wrapped Interferograms." Sensors 24.8 (2024): 2637. (Year: 2024).*

(Continued)

*Primary Examiner* — Ross Varndell
(74) *Attorney, Agent, or Firm* — Addison D. Ault; IPGentleman Intellectual Property Services, LLC

(57) ABSTRACT

In an intelligent identification method for creeping landslide hazards based on wrapped interferograms is proposed. Multi-scene time-continuous wrapped interferogram data are first acquired and upsampled to 128×128 using bilinear interpolation. Sine and cosine functions are applied to generate sine and cosine phases, which are mapped into the RGB color space for multidimensional representation. A multi-branch network with shared weights extracts features independently, and same-layer features are fused to enhance high-level semantics. Then, the decoder progressively restores the feature information and completes the classification mapping, yielding the identification result of a single-scene interferogram. Finally, the model generalization mechanism based on an intersection and merging decision is applied to produce the final recognition result.

16 Claims, 3 Drawing Sheets

(51) Int. Cl.
*G06T 11/00* (2006.01)
*G06V 10/764* (2022.01)
*G06V 10/77* (2022.01)
*G06V 10/82* (2022.01)
*G06V 20/10* (2022.01)
*G06V 20/70* (2022.01)

(52) U.S. Cl.
CPC ........ *G06V 10/764* (2022.01); *G06V 10/7715* (2022.01); *G06V 10/82* (2022.01); *G06V 20/10* (2022.01); *G06V 20/70* (2022.01)

(58) Field of Classification Search
CPC ........ G06V 10/60; G06V 20/70; G06V 20/64; G01B 11/24; G06F 3/01; H04N 13/00
See application file for complete search history.

(56) References Cited

OTHER PUBLICATIONS

Vardhan, KV Vishnu, et al. "Detection and Prediction of Landslide Vulnerability through Case Study using DInSAR Technique and U-net Model." 2023 5th International Conference on Smart Systems and Inventive Technology (ICSSIT). IEEE, 2023. (Year: 2023).*
Ruixuan Zhang, et al., MB-Net: A network for accurately identifying creeping landslides from wrapped interferograms, International Journal of Applied Earth Observation and Geoinformation, 2024, pp. 1-12, vol. 135 No. 104300.
Lin Tao, et al., Study on Automatic Identification Method of Wide-area InSAR Mining Subsidence Area Based on U2-Net, Metal Mine, 2024, pp. 177-185, Series No. 574.
Zhiqiang Xiong, et al., InSAR-based landslide detection method with the assistance of C-index, Landslides, 2023, pp. 2709-2723, vol. 20.
COMET-LiCS Sentinel-1 InSAR portal, (099A_06014_131313), retrieved from: https://comet.nerc.ac.uk/comet-lics-portal/.

* cited by examiner

INTELLIGENT IDENTIFICATION METHOD AND SYSTEM FOR CREEPING LANDSLIDE HAZARDS BASED ON WRAPPED INTERFEROGRAMS

CROSS REFERENCE TO THE RELATED APPLICATIONS

This application is based upon and claims priority to Chinese Patent Application No. 202411129593.1, filed on Aug. 16, 2024, the entire contents of which are incorporated herein by reference.

TECHNICAL FIELD

The present invention belongs to the field of synthetic aperture radar technology, specifically relates to an intelligent identification method and a system for creeping landslide hazards based on wrapped interferograms.

BACKGROUND

Landslides are a common geological hazard, which is a process of downward movement of rock and soil along a sliding surface. The occurrence of landslides is affected by factors such as topography, climatic conditions, and human activities. Landslides have a significant impact on human life and property, leading to a large number of casualties and economic losses every year. Therefore, it is essential to identify landslide hazards for disaster prevention and mitigation accurately. Conventional landslide identification relies on field surveys and in situ data collection, but is limited by restricted spatial coverage, insufficient real-time capability, and high cost. Advances in remote sensing technology have created new possibilities for non-contact and wide-area coverage of landslide detection. The high sensitivity of Interferometric Synthetic Aperture Radar (InSAR) to changes in surface displacement makes it an important tool for landslide identification. However, the application of InSAR technology for landslide identification in large-area rapid response scenarios is hindered due to the lack of effective automated analysis techniques and the over-reliance on expert knowledge.

As a data-driven technology, deep learning has profoundly changed the investigation task of geologic hazards through its highly efficient feature extraction capability. In studies that combine deep learning with InSAR techniques for landslide hazard identification, two methods are typically used. One method relates to recognizing the difference between the atmospheric delay phase and the deformation phase in the unwrapped interferograms. By employing image denoising techniques to segregate the atmospheric delay phase, the displacement is recovered and the deformation field boundaries are depicted. However, residual phases caused by atmospheric phase screens exhibit spatial similarity with deformed phases in unwrapped interferograms, and this similarity tends to lead to misclassification, thus limiting the generalizability of these methods.

InSAR-derived deformation products are considered in another method, this method uses time-series deformation products as network inputs, which aims at segmenting landslide deformation areas and accurately delineating boundaries through semantic segmentation and object detection technology. However, the implementation of this method is prone to be affected by factors such as decorrelation, significant terrain fluctuations, and steep deformation gradients, thereby leading to phase unwrapping errors and suboptimal data utilization. Additionally, the time and labor expenditures in the preparation phase are significantly increased with the computational intensity inherent in time-series InSAR processing, coupled with the high reliance on specialized knowledge.

SUMMARY

In order to solve the technical problems existing in the background technology, an objective of the present invention is to provide an intelligent identification method and a system for creeping landslide hazards based on a wrapped interferogram, aiming to accurately extract a creeping landslide area directly from a wrapped interferogram, and solve the defects of a high cost and a high computational strength in the existing technology.

In order to solve the aforementioned technical limitations, the technical solution of the present invention is:

an intelligent identification method for creeping landslide hazards based on wrapped interferograms, including:

S1: data acquisition and preprocessing: acquiring a multi-scene time-continuous wrapped interferogram of a target area, using a bilinear interpolation method, upsampling the wrapped interferogram to a network input size, mapping the wrapped interferogram into a sine phase and a cosine phase through sine and cosine functions, and mapping the upsampled wrapped interferogram, sine phase and cosine phase to a Red-Green-Blue (RGB) color space to obtain a three-channel RGB image;

S2: feature extraction and fusion: abstracting the three-channel RGB image into high-dimensional semantic information through three parallel encoding processes with shared weights, fusing same-layer encoding information of different branches through a feature fusion mechanism, restoring the semantic information into characterization information step-by-step through a decoder, finally completing classification label mapping, and outputting a single-scene interferogram prediction result output by a model;

S3: model generalization mechanism based on an intersection and union decision: producing a final prediction result through an intersection and union decision by using the single-scene interferogram prediction result output by the model.

Further, in the step S1, the original size of the data is upsampled to 128×128 pixels by using the bilinear interpolation method, and the size is adapted to a fixed data input size of the network; the wrapped interferogram is mapped into sine phase and cosine phase by a function mapping method;

the wrapped phase, sine phase and cosine phase are mapped to the RGB three-channel matrix by a color rendering method:

$$RGB(x,y)=C(I(x,y)) \qquad (1)$$

where C denotes a colormap function, I(x, y) denotes a pixel value of input single-channel data, and RGB(x, y) denotes a pixel value of mapped three-channel data.

Further, in the step S2, the three-channel RGB image is abstracted into high-dimensional semantic information through three parallel encoding processes with shared weights, including:

through encoding step-by-step, performing the feature extraction on the phase, cosine phase and sine phase according to three independent branches; the process consists of five encoding blocks, each encoding block is responsible for feature extraction and downsampling tasks, a convolutional block includes two convolutional layers (a 3×3 convolutional kernel, batch normalization, rectified linear unit and data compression is achieved through max pooling);
wherein a calculation formula for the convolution layer is:

$$O_{(:,:,z)} = \sum_{k=1}^{C} (M_{(:,:,k)} * F_{(:,:,k,z)}) + B_{(:,:,z)} \quad (2)$$

where $O_{(:,:,z)}$ denotes an output feature map of the $z^{th}$ channel, $M_{(:,:,k)}$ denotes an input feature map of the $k^{th}$ channel, * denotes a convolution operation, $F_{(:,:,k,z)}$ denotes a convolution kernel corresponding to $M_{(:,:,k)}$ and $O_{(:,:,z)}$, and $B_{(:,:,z)}$ denotes a bias matrix of the $z^{th}$ channel; C denotes a total number of channels of the input feature map;
a calculation formula for the batch normalization layer is:

$$O^z = [M^z - \mu_z] \frac{\gamma_z}{\sqrt{\sigma_z^2 + \varepsilon_z}} + \beta_z \quad (3)$$

where $O^z$ and $M^z$ denote the $z^{th}$ batch of output and input, respectively, and $\mu_z$ is a mean of a current batch, the formula is:

$$\mu_z = \frac{1}{m} \sum_{i=1}^{m} x_i \quad (4)$$

where $x_i \in [x_1, x_2, \ldots, x_m]$ denotes a set of m small batch variance of the batch, and the formula is:

$$\sigma_z^z = \frac{1}{m} \sum_{i=1}^{m} (x_i - \mu_z)^2 \quad (5)$$

$\sigma_z^2$ $\gamma_z$ and $\beta_z$ are learnable parameters, $\varepsilon_z$ prevents a denominator from being 0 during the operation;
a formula for the rectified linear unit is:

$$f(x) = \max(0, x) \quad (6)$$

where x is the input feature map, and a formula for the max pooling is expressed as:

$$f(x) = \max_{(m,n) \in R_{i,j}} x_{m,n} \quad (7)$$

where $x_{m,n}$ is a value of the input feature map in (m, n), and $R_{i,j}$ is a position set of a pooling domain on $x_{m,n}$.
Further, in the step S2, the same-layer encoding information of different branches is fused through the feature fusion mechanism, including:
through a superimposition of multi-branch features in a feature map dimension, fusing the same-layer information of different branches in the encoding process, and the mechanism has three parallel branches; in each branch, the input feature map first passes through a 3×3 convolution layer, and then performing an algebraic sum operation with itself; the formula is expressed as:

$$O = \sum_{k=1}^{3} (M_k * F_k) \quad (8)$$

where $M_k$ denotes the input feature map of the $k^{th}$ channel, * denotes a convolution operation, and $F_k$ denotes the convolution kernel of the $k^{th}$ channel.
Further, in the step S2, the semantic information is restored into characterization information step by step through the decoder, and finally, the classification label mapping is completed, including:
a decoding process includes a total of five decoding blocks: each decoding block, except for decoding block I which only contains a 1×1 convolution for class mapping, consists of a convolution block-skip connection layer-rectified linear unit-batch normalization—3×3 convolution and a 2× upsampling layer;
where a formula of skip connection layer is expressed as:

$$F_{concat} = \text{concat}(F_e, F_d) \quad (9)$$

where $F_e$ denotes a feature map output by the feature fusion mechanism, and Fa denotes a feature map corresponding to the current decoding layer; concat denotes a skip connection calculation, and $F_{concat}$ is an output result of the skip connection layer. Further, the step S3 specifically includes:
acquiring the final prediction product by taking an intersection and a union of the single-scene interferogram prediction result; a formula can be expressed as:

$$U = \bigcup_{i=1}^{n-k+1} (A_{i-1} \cap A_i \cap A_{i+1}) \quad (10)$$

where $A_i$, $A_{i-1}$, and $A_{i+1}$ denote the prediction results of adjacent three-scene interferograms, $\cap$ denotes an intersection operation, and $\cup$ denotes a union operation.
An intelligent identification system for creeping landslide hazards based on wrapped interferograms, the system is applied to the method described above, the system includes:
a data acquisition and preprocessing module, the data acquisition and preprocessing module is used for acquiring the multi-scene time-continuous wrapped interferogram of the target area, using the bilinear interpolation method, upsampling the wrapped interferogram to the network input size, mapping the upsampled wrapped interferogram into the sine phase and the cosine phase through sine and cosine functions, and mapping the upsampled wrapped interferogram, sine phase and cosine phase to the RGB color space to obtain the three-channel RGB image;
a feature extraction and fusion mechanism, the feature extraction and fusion mechanism is used for abstracting the three-channel RGB image into high-dimensional semantic information through three parallel encoding processes with shared weights, fusing same-layer encoding information of different branches through the feature fusion mechanism, restoring the semantic information into characterization information step-by-step through the decoder, finally completing classification label mapping, and outputting the single-scene interferogram prediction result output by the model;

an intersection and union decision processing module: the intersection and union decision processing module is used for producing the final prediction result through the intersection and union decision by using the single-scene interferogram prediction result output by the model.

A computer device, computer device includes memory, a processor, and a computer program stored on the memory and executable on the processor, the processor implements the intelligent identification method for creeping landslide hazards based on the wrapped interferograms described in any one of the above when executing the program.

A computer-readable storage medium, the computer-readable storage medium has stored a computer program on the computer-readable storage medium, when the program is executed by the processor, to implement the intelligent identification method for creeping landslide hazards based on wrapped interferograms described in any one of the above.

Compared to the existing technology, the advantages of the present invention are:

the deformation area and distribution of creeping landslide area obtained by InSAR data are adopted, the identification result can provide an important reference for the prevention and control of landslide hazards, and greatly improve the accuracy and efficiency of large-scale creeping landslide hazard identification.

Improved analysis accuracy: through the multi-scene time-continuous wrapped interferogram acquisition and the high-dimensional feature extraction, this method can effectively capture and express complex phase information, thus significantly improving the detection and classification accuracy of targets.

Enhanced information expression: through sine and cosine mapping, the phase information is converted into the three-channel RGB image, which enriches the color expression of the data, makes the subsequent feature extraction and analysis more visual, and improves the intuitivity and interpretability of the results.

Flexible network architecture: the multi-branch feature extraction framework is adopted to make the independent extraction of information from each channel more efficient, and the features of each channel can be effectively integrated through the feature fusion mechanism, thus improving the generalization ability and adaptability of the model.

Fast convergence: Through color mapping and multi-branch feature fusion, the convergence speed of the neural network is accelerated, which helps to shorten model training time and improve overall efficiency.

Wide application potential: the method is suitable for many fields, such as geological exploration, engineering monitoring and material testing, etc., which has good practical value and promotion prospects, and provides effective technical support for related research.

DETAILED DESCRIPTION OF THE EMBODIMENTS

The following describes specific embodiments of the present invention in combination with embodiments:

It should be noted that the structure, proportion, size, etc. illustrated in this specification are merely for the purpose of matching the contents disclosed in the specification for the understanding and reading of those skilled in the art, and are not intended to be used to limit the conditions under which the present invention can be practiced. Any modification of the structure, the change of the proportion relationship or the adjustment of the size, without affecting the efficacy and the purpose of the present invention, should still fall within the scope of the technical content revealed in the present invention.

Meanwhile, the terms "top", "bottom", "left", "right", "center" and "one" are used in this specification merely for the purpose of clarification of the description and are not intended to limit the scope of the present invention, and any changes or adjustments in the relative relationships of these terms are considered to be within the scope of the present invention without any substantial changes in the technical content.

Embodiment 1

Figure 1:
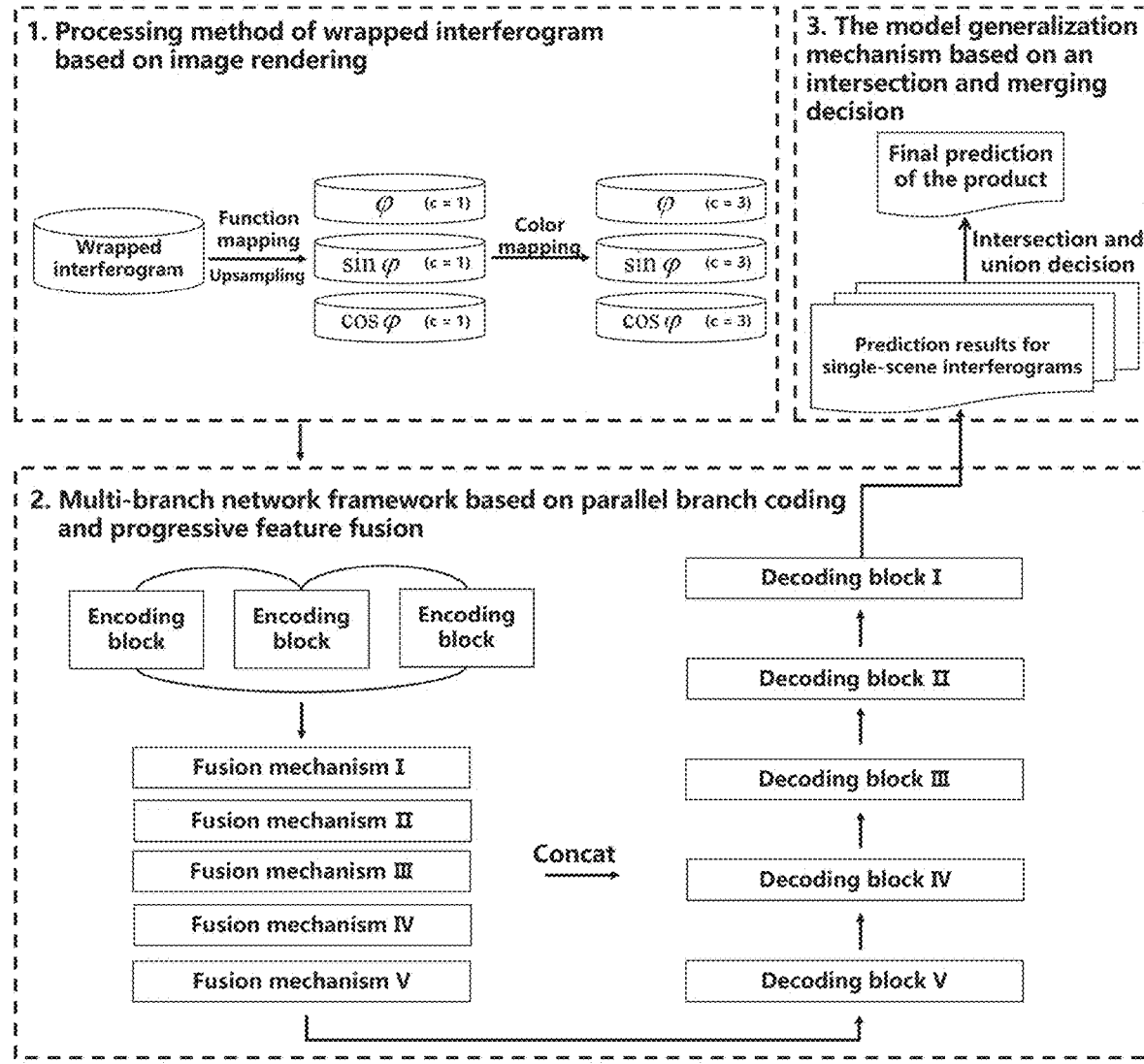
FIG. 1 is a main flow chart of the present invention.

As shown in FIG. 1, an intelligent identification method for creeping landslide hazards based on wrapped interferograms is provided, and the complete steps of the method of the present invention include:

(1) Processing Method of Wrapped Interferogram Based on Image Rendering

Step S101, the multi-scene time-continuous wrapped interferograms of the study area are acquired.

This step requires acquiring the wrapped interferogram of the study area, and the acquisition method of data can be searched and ordered from the Internet or acquired from the storage device.

Step S102, the wrapped interferogram is upsampled to the network input size.

This step uses bilinear interpolation to upsample the original size of the data to 128×128 pixels, which is used to satisfy the fixed data input size of the network.

Step S103, the wrapped interferogram is mapped into the sine phase and the cosine phase through sine and cosine functions.

This step maps the wrapped interferogram into the sine phase and cosine phase by function mapping, which is used to enrich the expression form of phase information and accelerate the convergence of the network.

Step S104, the phase (wrapped interferogram), sine phase, and cosine phase are mapped to the RGB color space through the established color interval.

This step uses color rendering to map the wrapped phase, sine phase, and cosine phase into the RGB three-channel matrix to achieve further refinement of the data in the channel dimension and accelerate network convergence.

$$RGB(x,y)=C(I(x,y)) \qquad (2)$$

where C denotes the colormap function, I(x, y) denotes the pixel value of input single-channel data, and RGB (x, y) denotes the pixel value of mapped three-channel data.

(2) Multi-Branch Network Framework Based on Parallel Branch Encoding and Progressive Feature Fusion Step S201, phase, cosine phase and sine phase are abstracted into high-dimensional semantic information through three parallel encoding processes with shared weights.

In this step, through encoding step-by-step, the feature extraction is performed on the phase, cosine phase and sine phase according to three independent branches. This process consists of five encoding blocks, each encoding block is responsible for feature extraction and downsampling tasks, the convolutional block includes two convolutional layers (a 3×3 convolutional kernel, batch normalization, rectified linear unit and data compression is achieved through maximum pooling).

Wherein the Calculation Formula for the Convolution Layer is:

$$O_{(:,:,z)} = \sum_{k=1}^{C} (M_{(:,:,k)} * F_{(:,:,k,z)}) + B_{(:,:,z)} \qquad (3)$$

where $O_{(:,:,z)}$ denotes the output feature map of the $z^{th}$ channel, $M_{(:,:,k)}$ denotes the input feature map of the $k^{th}$ channel, * denotes the convolution operation, $F_{(:,:,k,z)}$ denotes the convolution kernel corresponding to $M_{(:,:,k)}$ and $O_{(:,:,z)}$, and $B_{(:,:,z)}$ denotes the bias matrix of the $z^{th}$ channel.

The Calculation Formula for the Batch Normalization Layer is:

$$O^z = [M^z - \mu_z]\frac{\gamma_z}{\sqrt{\sigma_z^2 + \varepsilon_z}} + \beta_z \qquad (4)$$

where $O^z$ and $M^z$ denote $z^{th}$ batch of output and input, respectively, and $\mu_z$ is the mean of the current batch, the formula is:

$$\mu_z = \frac{1}{m}\sum_{i=1}^{m} x_i \qquad (5)$$

$\sigma_z^2$ is the variance of the current batch, the formula is:

$$\sigma_z^2 = \frac{1}{m}\sum_{i=1}^{m} (x_i - \mu_z)^2 \qquad (6)$$

$\gamma_z$ and $\beta_z$ are learnable parameters, $\varepsilon_z$ prevents the denominator from being 0 during the operation.

The formula for the rectified linear unit is:

$$f(x) = \max(0, x) \qquad (7)$$

The Formula for the Max Pooling is Expressed as:

$$f(x) = \max_{(m,n) \in R_{i,j}} x_{m,n} \qquad (8)$$

where $x_{m,n}$ is the value of the input feature map in (m, n), and $R_{i,j}$ is the position set of the pooling domain on $x_{m,n}$.

Step S202, the same-layer encoding information of different branches is fused through the feature fusion mechanism.

Figure 2:
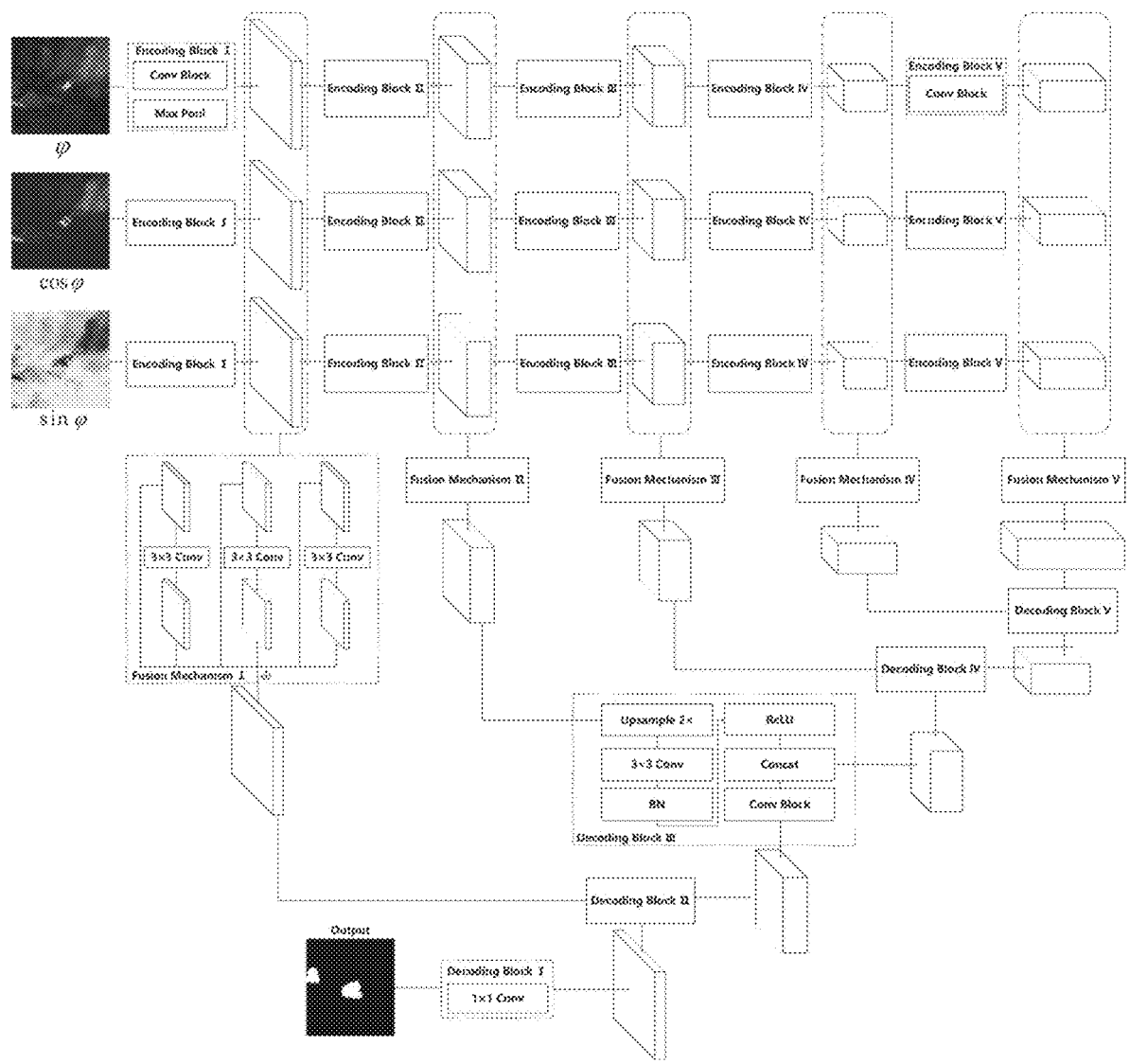
FIG. 2 is a network structure diagram.

As shown in FIG. 2, in this step, through the superimposition of multi-branch features in the feature map dimension, the same-layer information of different branches in the encoding process is fused. The mechanism has three parallel branches. In each branch, the input feature map first passes through the 3×3 convolution layer, and then the algebraic sum operation with itself is performed. The formula is expressed as:

$$O = \sum_{k=1}^{3} (M_k * F_k) \qquad (9)$$

where $M_k$ denotes the input feature map of the $k^{th}$ channel, * denotes the convolution operation, and $F_k$ denotes the convolution kernel of the $k^{th}$ channel.

Step S203, the semantic information is restored into characterization information step by step through the decoder, and finally, the classification label mapping is completed.

In this step, the decoding process includes a total of five specific decoding blocks. Each decoding block, except for decoding block I which only contains a 1×1 convolution for class mapping, consists of the convolution block-skip connection layer-rectified linear unit-batch normalization—3×3 convolution and a 2 times upsampling layer.

Where the formula of the skip connection layer is expressed as:

$$F_{concat} = \text{concat}(F_e, F_d) \qquad (10)$$

where $F_e$ denotes the feature map output by the feature fusion mechanism, and Fa denotes the feature map corresponding to the current decoding layer.

(3) the Model Generalization Mechanism Based on the Intersection and Union Decision S301: the final prediction result is produced through the intersection and union decision by using the single-scene interferogram prediction result output by the model.

In this step, the final prediction product is acquired by taking the intersection and the union of the single-scene interferogram prediction result. The formula can be expressed as:

$$U = \bigcup_{i=1}^{n-k+1} (A_{i-1} \cap A_i \cap A_{i+1}) \qquad (11)$$

where $A_i$, $A_{i-1}$, and $A_{i+1}$ denote the prediction results of adjacent three-scene interferograms, $\cap$ denotes the intersection operation, and $\cup$ denotes the union operation.

Embodiment 2

The optimization results are given in this embodiment, which uses publicly available data from the COMET-LiCS Sentinel-1InSAR portal (099A_06014_131313), the study area is the middle reaches of the Jinsha River in China, and the data period is from Jul. 30, 2019 to Oct. 22, 2019, with a temporal baseline of 12 days, and a total of 7 interferograms are included. The intelligent identification method and system for creeping landslide hazards based on the wrapped interferograms under actual conditions are shown in FIG. 3.

Figure 3:
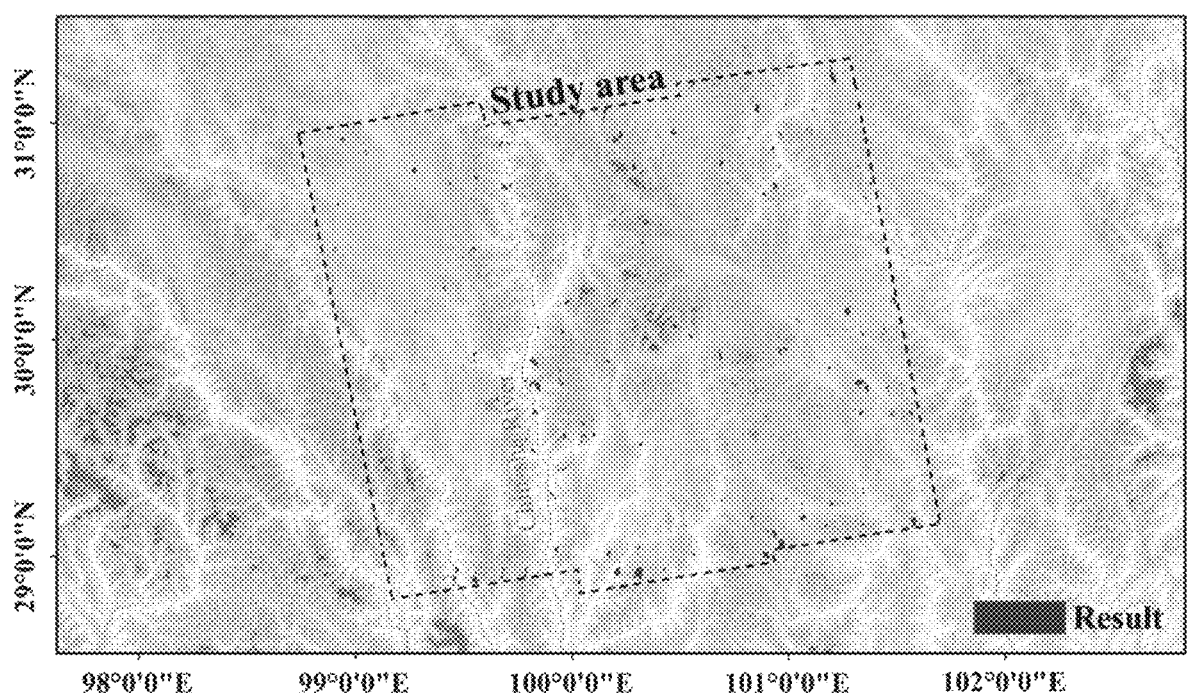
FIG. 3 is a model generalization diagram.

As shown in FIG. 3, the method of the present invention has the effect of accurately identifying creeping landslide areas in the middle reaches of the Jinsha River in China. Specifically, a sliding window prediction of these interferograms was performed by using MB-Net with a step size of 128. This process generated preliminary prediction outputs, which were 7 in total. Various noise factors present in the single-scene interferograms were considered, such as atmospheric delay errors, as well as the consideration that creeping landslides are a continuous process. Therefore, the adjacent results were combined to generate secondary prediction products, which were 5 in total. Additionally, in order to ensure that the boundaries of these regions are clear, the secondary prediction outputs were processed by merging to obtain the final products.

Embodiment 3

The embodiment provides a terminal device, the terminal device includes a processor and memory, the memory is used to store computer programs, the computer program includes program instructions, and the processor is used to execute program instructions stored in the computer storage medium. The processor may be a central processing unit (CPU), it can also be other general-purpose processors, Digital Signal Processor (DSP), Application Specific Integrated Circuit (ASIC), Field-Programmable Gate Array (FPGA) or other programmable logic devices, discrete gate, or transistor logic devices, discrete hardware components, etc., it is the computing core and control core of the terminal, and suitable for implementing one or more instructions, specifically suitable for loading and executing one or more instructions to achieve the corresponding method flow or corresponding function; the processor described in the embodiment of the present invention can be used for the operation of an intelligent identification method for creeping landslide hazards based on wrapped interferograms, which includes the following steps:
  S1: data acquisition and preprocessing: the multi-scene time-continuous wrapped interferogram of the target area is acquired, the bilinear interpolation method is used, the wrapped interferogram is upsampled to the network input size, the wrapped interferogram is mapped into the sine phase and the cosine phase through sine and cosine functions, and the upsampled wrapped interferogram, sine phase and cosine phase are mapped to the RGB color space to obtain the three-channel RGB image;
  S2: feature extraction and fusion: the three-channel RGB image is abstracted into high-dimensional semantic information through three parallel encoding processes with shared weights, same-layer encoding information of different branches is fused through the feature fusion mechanism, the semantic information is restored into characterization information step-by-step through the decoder, finally the classification label mapping is completed, and the single-scene interferogram prediction result output by the model is output; and
  S3: model generalization mechanism based on the intersection and union decision: the final prediction result is produced through the intersection and union decision by using the single-scene interferogram prediction result output by the model.

Embodiment 4

This embodiment provides a storage medium, specifically a computer-readable storage medium (Memory), which is a memory device in the terminal device for storing programs and data. It is to be understood that the computer-readable storage medium herein may include both the built-in storage medium in the terminal device, as well as the extended storage medium supported by the terminal device, naturally. The computer-readable storage medium provides storage space, and the storage space stores the operating system of the terminal. Furthermore, one or more instructions are suitable for loading and execution by the processor, the instructions may be one or more computer programs (including program code). It is noted that the computer-readable storage medium herein may be a high-speed RAM memory or a non-volatile memory, such as at least one disk memory.

One or more instructions stored in the computer-readable storage medium can be loaded and executed by the processor to implement the corresponding steps in the above-mentioned embodiment concerning an intelligent identification method for creeping landslide hazards based on the wrapped interferograms; one or more instructions of the computer-readable storage medium are loaded by the processor and perform the following steps:
  S1: data acquisition and preprocessing: the multi-scene time-continuous wrapped interferogram of the target area is acquired, the bilinear interpolation method is used, the wrapped interferogram is upsampled to the network input size, the wrapped interferogram is mapped into the sine phase and the cosine phase through sine and cosine functions, and the upsampled wrapped interferogram, sine phase and cosine phase are mapped to the RGB color space to obtain the three-channel RGB image;
  S2: feature extraction and fusion: the three-channel RGB image is abstracted into high-dimensional semantic information through three parallel encoding processes with shared weights, same-layer encoding information of different branches is fused through the feature fusion mechanism, the semantic information is restored into characterization information step-by-step through the decoder, finally the classification label mapping is completed, and the single-scene interferogram prediction result output by the model is output;
  S3: model generalization mechanism based on the intersection and union decision: the final prediction result is produced through the intersection and union decision by using the single-scene interferogram prediction result output by the model.

It should be understood by those skilled in the art that embodiments of the present invention may be provided as methods, systems, or computer program products. Thus, the present invention can take the form of a fully hardware embodiment, a fully software embodiment, or an embodiment that combines software and hardware aspects. Moreover, the present invention can take the form of a computer program product implemented on one or more computer-usable storage media (including, but not limited to, disk memory, CD-ROM, optical memory, and the like) that contain computer-usable program code therein.

The present invention is described with reference to flowcharts and/or block diagrams of methods, devices (systems), and computer program products according to embodiments of the present invention. It is to be understood that each of the processes and/or boxes in the flowcharts and/or block diagrams, and combinations of the processes and/or boxes in the flowcharts and/or block diagrams, may be implemented by computer program instructions. These computer program instructions may be provided to a processor of a general-purpose computer, a specialized computer, an embedded processor, or other programmable data processing device to produce a machine such that the instructions executed by the processor of the computer or other programmable data processing device produce a device for carrying out the functions specified in the one process or multiple processes of the flowchart and/or the one block or multiple blocks of the block diagram.

These computer program instructions can also be stored in a computer-readable memory that can guide a computer or other programmable data processing device to work in a specific way, so that the instructions stored in the computer-readable memory produce a manufactured product including an instruction device that implements a function specified in a flow chart or multiple processes and/or a block diagram or multiple blocks.

These computer program instructions can also be loaded onto a computer or other programmable data processing device, so that a series of operation steps are performed on the computer or other programmable device to generate computer-implemented processing, so that the instructions executed on the computer or other programmable device provide the steps for implementing the functions specified in a flow chart or multiple processes and/or a block diagram or multiple blocks.

The above-mentioned preferred embodiments of the present invention have been described in detail, but the present invention is not limited to the above embodiments, within the scope of knowledge of ordinary technical personnel in the field, various changes can also be made without departing from the objective of the present invention under the premise.

A great many other changes and adaptations can be made without departing from the conception and scope of the present invention. It should be understood that the present invention is not limited to a specific embodiment and that the scope of the present invention is defined by the attached claims.

What is claimed is:

1. An intelligent identification method for creeping landslide hazards based on wrapped interferograms, comprising:
    S1: data acquisition and preprocessing: acquiring a multi-scene time-continuous wrapped interferogram of a target area, using a bilinear interpolation method, upsampling the multi-scene time-continuous wrapped interferogram to a network input size to obtain an upsampled wrapped interferogram, mapping the upsampled wrapped interferogram into a sine phase and a cosine phase through sine and cosine functions, and mapping the upsampled wrapped interferogram, the sine phase and the cosine phase to a Red-Green-Blue (RGB) color space to obtain a three-channel RGB image;
    S2: feature extraction and fusion: abstracting the three-channel RGB image into high-dimensional semantic information through three parallel encoding processes with shared weights, through encoding step-by-step, performing the feature extraction on a phase, the cosine phase and the sine phase according to three independent branches; a process consists of five encoding blocks, each encoding block is configured for feature extraction and downsampling tasks, a convolutional block comprises two convolutional layers, (a 3×3 convolutional kernel, batch normalization, rectified linear unit and data compression is achieved through maximum pooling), fusing same-layer encoding information of different branches through a feature fusion mechanism, through a superimposition of multi-branch features in a feature map dimension, fusing the same-layer information of different branches in an encoding process, and the feature fusion mechanism has three parallel branches; in each branch, an input feature map first passes through a 3×3 convolution layer, and then performing an algebraic sum operation with itself; the formula is expressed as:

$$O = \sum_{k=1}^{3}(M_k * F_k) \qquad (8)$$

wherein $M_k$ denotes the input feature map of a $k^{th}$ channel, * denotes a convolution operation, and $F_k$ denotes a convolution kernel of the $k^{th}$ channel;

restoring the high-dimensional semantic information into characterization information step-by-step through a decoder, finally completing classification label mapping, a decoding process comprises a total of five decoding blocks: each decoding block, except for decoding block I which only contains a 1×1 convolution for class mapping, consists of a convolution block-skip connection layer-rectified linear unit-batch normalization—3×3 convolution and a 2× upsampling layer; and outputting a single-scene interferogram prediction result output by a model; and S3: model generalization mechanism based on an intersection and union decision: acquiring a final prediction product by taking an intersection and a union of the single-scene interferogram prediction result by a formula expressed as:

$$U = U_{i=1}^{n-k+1}(A_{i-1} \cap A_i \cap A_{i+1}) \qquad (10)$$

wherein $A_i$, $A_{i-1}$, and $A_{i+1}$ denote prediction results of adjacent three-scene interferograms, $\cap$ denotes an intersection operation, and $\cup$ denotes a union operation.

2. The intelligent identification method according to claim 1, wherein in the step S1, an original size of data is upsampled to 128×128 pixels by using the bilinear interpolation method to be adapted to a fixed data input size of a network; the upsampled wrapped interferogram is mapped into the sine phase and the cosine phase by a function mapping method;

a wrapped phase, the sine phase and the cosine phase are mapped to an RGB three-channel matrix by a color rendering method:

$$RGB(x,y)=C(I(x,y)) \qquad (1)$$

wherein C denotes a colormap function, I(x,y) denotes a pixel value of input single-channel data, and RGB(x,y) denotes a pixel value of mapped three-channel data.

3. The intelligent identification method according to claim 1, wherein in the step S2:
a calculation formula for a convolution layer is:

$$O_{(:,:,z)} = \sum_{k=1}^{C}(M_{(:,:,k)} * F_{(:,:,k,z)} + B_{(:,:,z)}) \quad (2)$$

wherein $O_{(:,:,z)}$ denotes an output feature map of a $z^{th}$ channel, $M_{(:,:,k)}$ denotes an input feature map of a $k^{th}$ channel, $*$ denotes a convolution operation, $F_{(:,:,k,z)}$ denotes a convolution kernel corresponding to $M_{(:,:,k)}$ and $O_{(:,:,z)}$, and $B_{(:,:,z)}$ denotes a bias matrix of the $z^{th}$ channel; and C denotes a total number of channels of the input feature map;
a calculation formula for a batch normalization layer is:

$$O^z = [M^z - \mu_z]\frac{\gamma_z}{\sqrt{\sigma_z^2 + \varepsilon_z}} + \beta_z \quad (3)$$

wherein $O^z$ and $M^z$ denote a $z^{th}$ batch of output and input, respectively, and $\mu_z$ is a mean of a current batch and is expressed as:

$$\mu_z = \frac{1}{m}\sum_{i=1}^{m} x_i \quad (4)$$

wherein $x_i \in [x_1, x_2, \ldots, x_m]$ denotes a set of m small batch input data, and $$\sigma_z^2$$

is a variance of the batch and is expressed as:

$$\sigma_z^2 = \frac{1}{m}\sum_{i=1}^{m}(x_i - \mu_z)^2 \quad (5)$$

$\gamma_z$ and $\beta_z$ are learnable parameters, and $\varepsilon_z$ prevents a denominator from being 0 during an operation;
a formula for the rectified linear unit is:

$$f(x) = \max(0, x) \quad (6)$$

wherein x is the input feature map, and a formula for max pooling is expressed as:

$$f(x) = \max_{(m,n) \in R_{i,j}} x_{m,n} \quad (7)$$

wherein $x_{m,n}$ is a value of the input feature map in (m, n), and $R_{i,j}$ is a position set of a pooling domain on $x_{m,n}$, where i and j denote spatial position indices identifying the location of the pooling domain.

4. The intelligent identification method according to claim 1, wherein in the step S2,
wherein a formula of a skip connection layer is expressed as:

$$F_{concat} = \text{concat}(F_e, F_d) \quad (9)$$

wherein $F_e$ denotes a feature map output by the feature fusion mechanism, and $F_d$ denotes a feature map corresponding to a current decoding layer; concat denotes a skip connection calculation, and $F_{concat}$ is an output result of the skip connection layer.

5. An intelligent identification system for creeping landslide hazards based on wrapped interferograms, applied to the intelligent identification method according to claim 1, and comprising:
a data acquisition and preprocessing module, wherein the data acquisition and preprocessing module is configured for acquiring the multi-scene time-continuous wrapped interferogram of the target area, using the bilinear interpolation method, upsampling the multi-scene time-continuous wrapped interferogram to the network input size to obtain the upsampled wrapped interferogram, mapping the upsampled wrapped interferogram into the sine phase and the cosine phase through the sine and cosine functions, and mapping the upsampled wrapped interferogram, the sine phase and the cosine phase to the RGB color space to obtain the three-channel RGB image;
a feature extraction and fusion mechanism, wherein the feature extraction and fusion mechanism is configured for abstracting the three-channel RGB image into the high-dimensional semantic information through the three parallel encoding processes with the shared weights, fusing the same-layer encoding information of different branches through the feature fusion mechanism, restoring the high-dimensional semantic information into the characterization information step-by-step through the decoder, finally completing classification label mapping, and outputting the single-scene interferogram prediction result output by the model; and
an intersection and union decision processing module, wherein the intersection and union decision processing module is configured for producing the final prediction result through the intersection and union decision by using the single-scene interferogram prediction result output by the model.

6. A computer device, comprising a memory, a processor, and a computer program stored on the memory and executable on the processor, wherein the processor implements the intelligent identification method according to claim 1 when executing the computer program.

7. A non-transitory computer-readable storage medium, wherein a computer program is stored on the non-transitory computer-readable storage medium, and when the computer program is executed by a processor, the intelligent identification method according to claim 1 is implemented.

8. The intelligent identification system according to claim 5, wherein in the step S1, an original size of data is upsampled to 128×128 pixels by using the bilinear interpolation method to be adapted to a fixed data input size of a network; the upsampled wrapped interferogram is mapped into the sine phase and the cosine phase by a function mapping method;
a wrapped phase, the sine phase and the cosine phase are mapped to an RGB three-channel matrix by a color rendering method:

$$RGB(x,y) = C(I(x,y)) \quad (1)$$

wherein C denotes a colormap function, I(x,y) denotes a pixel value of input single-channel data, and RGB(x,y) denotes a pixel value of mapped three-channel data.

9. The intelligent identification system according to claim 5, wherein in the step S2:

a calculation formula for a convolution layer is:

$$O_{(:,:,z)} = \sum_{k=1}^{C} (M_{(:,:,k)} * F_{(:,:,k,z)}) + B_{(:,:,z)} \qquad (2)$$

wherein $O_{(:,:,z)}$ denotes an output feature map of a $z^{th}$ channel, $M_{(:,:,k)}$ denotes an input feature map of a $k^{th}$ channel, * denotes a convolution operation, $F_{(:,:,k,z)}$ denotes a convolution kernel corresponding to $M_{(:,:,k)}$ and $O_{(:,:,z)}$ and $B_{(:,:,z)}$ denotes a bias matrix of the $z^{th}$ channel; and C denotes a total number of channels of the input feature map;

a calculation formula for a batch normalization layer is:

$$O^z = [M^z - \mu_z]\frac{\gamma_z}{\sqrt{\sigma_z^2 + \varepsilon_z}} + \beta_z \qquad (3)$$

wherein $O^z$ and $M^z$ denote a $z^{th}$ batch of output and input, respectively, and $\mu_z$ is a mean of a current batch and is expressed as:

$$\mu_z = \frac{1}{m}\sum_{i=1}^{m} x_i \qquad (4)$$

wherein $x_i \in [x_1, x_2, \ldots, x_m]$ denotes a set of m small batch input data, and $$\sigma_z^2$$

is a variance of the batch and is expressed as:

$$\sigma_z^2 = \frac{1}{m}\sum_{i=1}^{m} (x_i - \mu_z)^2 \qquad (5)$$

$\gamma_z$ and $\beta_z$ are learnable parameters, and $\varepsilon_z$ prevents a denominator from being 0 during an operation;

a formula for the rectified linear unit is:

$$f(x) = \max(0, x) \qquad (6)$$

wherein x is the input feature map, and a formula for max pooling is expressed as:

$$f(x) = \max_{(m,n) \in R_{i,j}} x_{m,n} \qquad (7)$$

wherein $x_{m,n}$ is a value of the input feature map in (m, n), and $R_{i,j}$ is a position set of a pooling domain on $x_{m,n}$, where i and j denote spatial position indices identifying the location of the pooling domain.

10. The intelligent identification system according to claim 5, wherein in the step S2, wherein a formula of a skip connection layer is expressed as:

$$F_{concat} = concat(F_e, F_d) \qquad (9)$$

wherein $F_e$ denotes a feature map output by the feature fusion mechanism, and $F_d$ denotes a feature map corresponding to a current decoding layer; concat denotes a skip connection calculation, and $F_{concat}$ is an output result of the skip connection layer.

11. The computer device according to claim 6, wherein in the step S1, an original size of data is upsampled to 128×128 pixels by using the bilinear interpolation method to be adapted to a fixed data input size of a network; the upsampled wrapped interferogram is mapped into the sine phase and the cosine phase by a function mapping method;

a wrapped phase, the sine phase and the cosine phase are mapped to an RGB three-channel matrix by a color rendering method:

$$RGB(x,y) = C(I(x,y)) \qquad (1)$$

wherein C denotes a colormap function, I(x,y) denotes a pixel value of input single-channel data, and RGB(x,y) denotes a pixel value of mapped three-channel data.

12. The computer device according to claim 6, wherein in the step S2:

a calculation formula for a convolution layer is:

$$O_{(:,:,z)} = \sum_{k=1}^{C} (M_{(:,:,k)} * F_{(:,:,k,z)}) + B_{(:,:,z)} \qquad (2)$$

wherein $O_{(:,:,z)}$ denotes an output feature map of a $z^{th}$ channel, $M_{(:,:,k)}$ denotes an input feature map of a $k^{th}$ channel, * denotes a convolution operation, $F_{(:,:,k,z)}$ denotes a convolution kernel corresponding to $M_{(:,:,k)}$ and $O_{(:,:,z)}$ and $B_{(:,:,z)}$ denotes a bias matrix of the $z^{th}$ channel; and C denotes a total number of channels of the input feature map;

a calculation formula for a batch normalization layer is:

$$O^z = [M^z - \mu_z]\frac{\gamma_z}{\sqrt{\sigma_z^2 + \varepsilon_z}} + \beta_z \qquad (3)$$

wherein $O^z$ and $M^z$ denote a $z^{th}$ batch of output and input, respectively, and $\mu_z$ is a mean of a current batch and is expressed as:

$$\mu_z = \frac{1}{m}\sum_{j=1}^{m} x_i \qquad (4)$$

wherein $x_i \in [x_1, x_2, \ldots, x_m]$ denotes a set of m small batch input data, and $$\sigma_z^2$$

is a variance of the batch and is expressed as:

$$\sigma_z^2 = \frac{1}{m}\sum_{i=1}^{m} (x_i - \mu_z)^2 \qquad (5)$$

$\gamma_z$ and $\beta_z$ are learnable parameters, and $\varepsilon_z$ prevents a denominator from being 0 during an operation;

a formula for the rectified linear unit is:

$$f(x) = \max(0, x) \qquad (6)$$

wherein x is the input feature map, and a formula for max pooling is expressed as:

$$f(x) = \max_{(m,n) \in R_{i,j}} x_{m,n} \qquad (7)$$

wherein $x_{m,n}$ is a value of the input feature map in (m, n), and $R_{i,j}$ is a position set of a pooling domain on $x_{m,n}$, where i and j denote spatial position indices identifying the location of the pooling domain.

13. The computer device according to claim 6, wherein in the step S2,
wherein a formula of a skip connection layer is expressed as:

$$F_{concat} = \text{concat}(F_e, F_d) \qquad (9)$$

wherein $F_e$ denotes a feature map output by the feature fusion mechanism, and $F_d$ denotes a feature map corresponding to a current decoding layer; concat denotes a skip connection calculation, and $F_{concat}$ is an output result of the skip connection layer.

14. The non-transitory computer-readable storage medium according to claim 7, wherein in the step S1, an original size of data is upsampled to 128×128 pixels by using the bilinear interpolation method to be adapted to a fixed data input size of a network; the upsampled wrapped interferogram is mapped into the sine phase and the cosine phase by a function mapping method;
a wrapped phase, the sine phase and the cosine phase are mapped to an RGB three-channel matrix by a color rendering method:

$$RGB(x,y) = C(I(x,y)) \qquad (1)$$

wherein C denotes a colormap function, I(x,y) denotes a pixel value of input single-channel data, and RGB(x,y) denotes a pixel value of mapped three-channel data.

15. The non-transitory computer-readable storage medium according to claim 7, wherein in the step S2:
a calculation formula for a convolution layer is:

$$O_{(:,:,z)} = \sum_{k=1}^{C} (M_{(:,:,k)} * F_{(:,:,k,z)}) + B_{(:,:,z)} \qquad (2)$$

wherein $O_{(:,:,z)}$ denotes an output feature map of a $z^{th}$ channel, $M_{(:,:,k)}$ denotes an input feature map of a $k^{th}$ channel, * denotes a convolution operation, $F_{(:,:,k,z)}$ denotes a convolution kernel corresponding to $M_{(:,:,k)}$ and $O_{(:,:,z)}$ and $B_{(:,:,z)}$ denotes a bias matrix of the $z^{th}$ channel; and C denotes a total number of channels of the input feature map;

a calculation formula for a batch normalization layer is:

$$O^z = [M^z - \mu_z] \frac{\gamma_z}{\sqrt{\sigma_z^2 + \varepsilon_z}} + \beta_z \qquad (3)$$

wherein $O^z$ and $M^z$ denote a $z^{th}$ batch of output and input, respectively, and $\mu_z$ is a mean of a current batch and is expressed as:

$$\mu_z = \frac{1}{m} \sum_{i=1}^{m} x_i \qquad (4)$$

wherein $x_i \in [x_1, x_2, \ldots, x_m]$ denotes a set of m small batch input data, and $$\sigma_z^2$$

is a variance of the batch and is expressed as:

$$\sigma_z^2 = \frac{1}{m} \sum_{j=1}^{m} (x_i - \mu_z)^2 \qquad (5)$$

$\gamma_z$ and $\beta_z$ are learnable parameters, and $\varepsilon_z$ prevents a denominator from being 0 during an operation;
a formula for the rectified linear unit is:

$$f(x) = \max(0, x) \qquad (6)$$

wherein x is the input feature map, and a formula for max pooling is expressed as:

$$f(x) = \max_{(m,n) \in R_{i,j}} x_{m,n} \qquad (7)$$

wherein $x_{m,n}$ is a value of the input feature map in (m, n), and $R_{i,j}$ is a position set of a pooling domain on $x_{m,n}$, where i and j denote spatial position indices identifying the location of the pooling domain.

16. The non-transitory computer-readable storage medium according to claim 7, wherein in the step S2,
wherein a formula of a skip connection layer is expressed as:

$$F_{concat} = \text{concat}(F_e, F_d) \qquad (9)$$

wherein $F_e$ denotes a feature map output by the feature fusion mechanism, and $F_d$ denotes a feature map corresponding to a current decoding layer; concat denotes a skip connection calculation, and $F_{concat}$ is an output result of the skip connection layer.

* * * * *